United States Patent [19]

Winzer

[11] 4,307,932
[45] Dec. 29, 1981

[54] ARRANGEMENT FOR DETECTING A BRANCHED OFF SIGNAL

[75] Inventor: Gerhard Winzer, Munich, Fed. Rep. of Germany

[73] Assignee: Siemens Aktiengesellschaft, Berlin & Munich, Fed. Rep. of Germany

[21] Appl. No.: 941,328

[22] Filed: Sep. 11, 1978

[30] Foreign Application Priority Data

Sep. 30, 1977 [DE] Fed. Rep. of Germany ....... 2744128

[51] Int. Cl.³ ............................................. G02B 5/172
[52] U.S. Cl. .............................. 350/96.15; 350/96.17; 357/30
[58] Field of Search ............... 350/96.15, 96.16, 96.17, 350/96.29, 96.30, 96.20; 250/227; 357/30

[56] References Cited

U.S. PATENT DOCUMENTS

| | | | |
|---|---|---|---|
| 3,653,739 | 4/1972 | Strack | 350/96.15 X |
| 3,801,389 | 4/1974 | Fujimura | 156/6 |
| 3,931,518 | 1/1976 | Miller | 250/227 |
| 3,936,631 | 2/1976 | Muska | 250/227 |
| 3,969,014 | 7/1976 | Auracher | 350/96.17 |
| 3,982,123 | 9/1976 | Goell et al. | 250/227 |
| 4,019,051 | 4/1977 | Miller | 250/227 |
| 4,076,375 | 2/1978 | Muska et al. | 350/96.15 |
| 4,103,154 | 7/1978 | d'Auria et al. | 250/227 |
| 4,130,343 | 12/1978 | Miller et al. | 350/96.15 |
| 4,135,780 | 1/1979 | Dyott | 350/96.15 |
| 4,144,541 | 3/1979 | Schaefer et al. | 357/30 |
| 4,173,390 | 11/1979 | Käch | 350/96.16 |
| 4,186,994 | 2/1980 | Denkin et al. | 350/96.17 |

FOREIGN PATENT DOCUMENTS

| | | |
|---|---|---|
| 2363253 | 6/1975 | Fed. Rep. of Germany . |
| 2550523 | 5/1976 | Fed. Rep. of Germany . |
| 2614051 | 9/1977 | Fed. Rep. of Germany ... 350/96.16 |
| 1376630 | 12/1974 | United Kingdom . |

OTHER PUBLICATIONS

Kuwahara et al., "A Semi-Transparent Mirror-Type Directional Coupler . . . ", *IEEE Trans. on M Wave Theory & Tech.*, Jan. 1975, pp. 179–180.

Hsu et al., "Single Mode Optical Fiber Pickoff Coupler", *Applied Optics*, vol. 15, No. 10, Oct. 1976, pp. 2310–2312.

Jeunhomme et al., "Directional Coupler for Multimode Optical Fibers", *Appl. Phys. Ltrs.*, vol. 29, No. 8, Oct. 1976, pp. 485–487.

Unger, *Optische Nachrichtentechnik*, Elitera-Verlag, Berlin, Germany, 1976, Sections 5.1 and 5.2, pp. 83–88.

Crow, "Integral Source/Receiver Package For Optical Data", *IBM Tech. Discl. Bull.*, vol. 20, No. 5, Oct. 1977, pp. 2089–2090.

*Primary Examiner*—John D. Lee
*Attorney, Agent, or Firm*—Hill, Van Santen, Steadman, Chiara & Simpson

[57] ABSTRACT

An arrangement for branching off a signal from an optical waveguide and detecting the signal with a detector characterized by the waveguide in the area of the detector being free of bends and having means, such as a notch or an entire separation, for forming a signal dispersing point located in the area of a window of the detector.

15 Claims, 7 Drawing Figures

ARRANGEMENT FOR DETECTING A BRANCHED OFF SIGNAL

BACKGROUND OF THE INVENTION

1. Field of the Invention

The present invention is directed to an arrangement for detecting a light signal which is branched from a waveguide and detected by a detector having a detector window.

2. Prior Art

Arrangements for branching off a signal from an optical waveguide, such as an optical fiber, and detecting the signal with a detector are known and disclosed in German Offenlegungsschrift No. 25 50 523, which is based on three U.S. patent applications that matured into U.S. Pat. Nos. 3,931,518, 3,936,631 and 3,982,123. These arrangements are used as devices for scanning signals carried in waveguides. For this purpose, the waveguide is curved by means of a mechanical pressing or bending apparatus to such an extent that part of the signal carried in the waveguide is discharged from it laterally and the signal thus branched off is received by the detector. However, since a detector window does not extend over the entire curvature of the waveguide and thus the radiating surface, only part of the branched off signal is received. Moreover, the branched off signal can be generated only in those cases where the pressing apparatus has been actuated to bend the waveguide. While the pressing of the waveguide to bend it may be acceptable for practical applications on one hand, on the other hand the continual pressing of the fiber raises problems with uncontrolled fiber rupture which is inherent with this practice.

SUMMARY OF THE INVENTION

The present invention is directed to providing an arrangement for branching off a signal from an optical waveguide such as a fiber and detecting the branched signal with a detector having a detector window wherein the entire branched off signal is received by the detector and wherein no bending of the waveguide with a pressing apparatus is required. This problem is solved in that the waveguide is free of bends in the area of the detector window and has means for forming a signal dispersing point located in the area of the detector window so that the entire branched off signal is received by the detector.

In one embodiment of the invention, the means for forming a signal dispersing point comprises a notch provided in the waveguide. Another embodiment of the means for forming a signal dispersing point comprises a complete separation of the waveguide with the separated ends abutting one another. In a second embodiment, preferably an immersion material is placed between the abutting ends and this immersion material may be the same material which is used to form guides photolithographically on a substrate which guides guide and support the waveguide.

Particular advantages of the arrangement of the invention reside in its simple design, its low loss, and the convenient connectability of the arrangement to other waveguides. In addition, the arrangement provides an adjustability of the defined branched off relationship and a good degree of effectiveness for the transmission of the signal into the detector.

BRIEF DESCRIPTION OF THE DRAWINGS

FIG. 1b is a longitudinal cross section taken along line Ib—Ib of FIG. 1a;

FIG. 2b is a longitudinal cross section taken along line IIb—IIb of FIG. 2a;

FIG. 3b is a cross-sectional view taken along line IIIb—IIIb in FIG. 3a; and

DESCRIPTION OF THE PREFERRED EMBODIMENTS

Figure 1A:
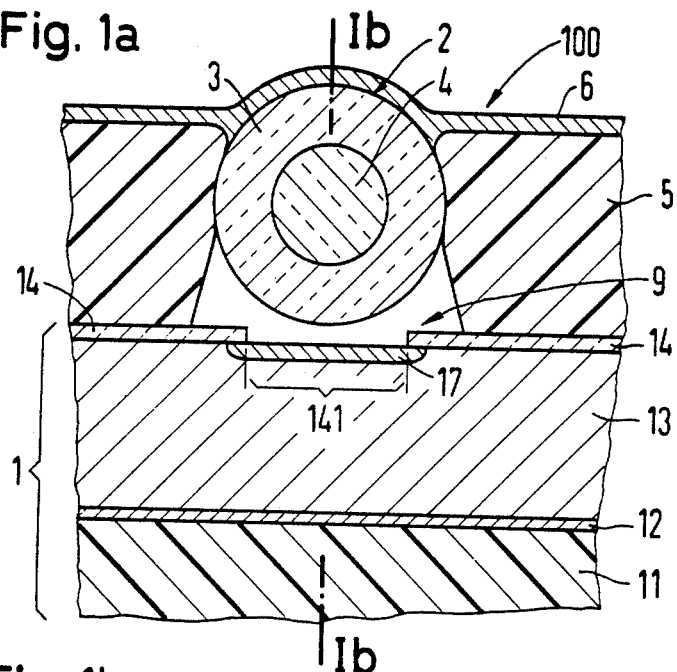
FIG. 1a is a transverse cross-sectional view of the arrangement in accordance to the present invention as taken along line Ia–Ia in FIG. 1b.
Figure 1B:
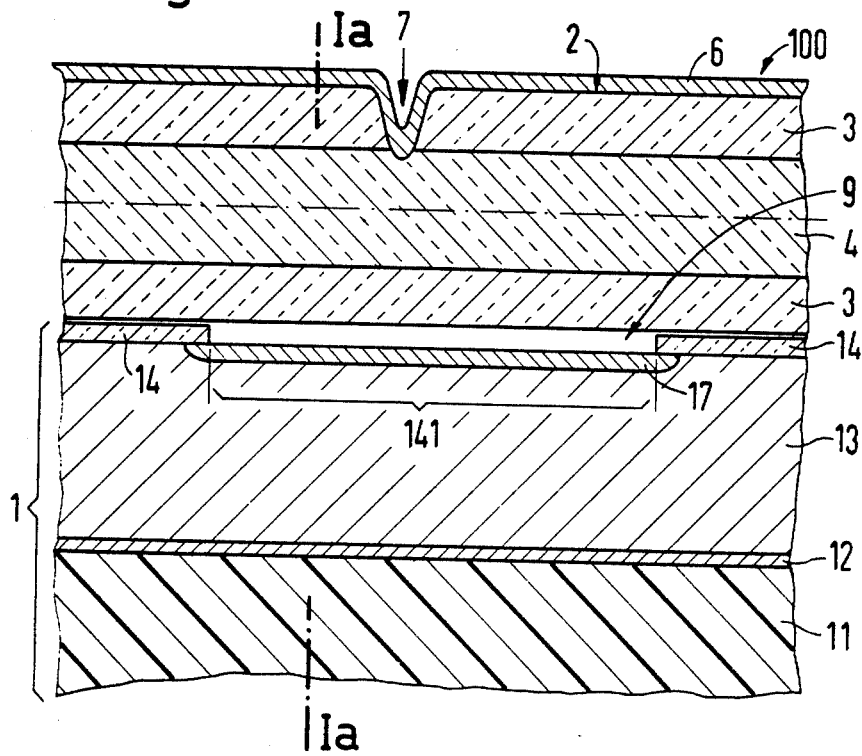

The principles of the present invention are particularly useful in an arrangement generally indicated at 100 in FIGS. 1a and 1b for branching a light signal from a waveguide generally indicated at 2 and for detecting the branched signal in a detector generally indicated at 9.

As illustrated in FIGS. 1a and 1b, the waveguide 2 is a glass optical fiber having a core 4 surrounded by a jacket or cladding layer 3. The fiber 2 is supported on a substrate 1. As illustrated, the fiber 2 is maintained at a desired position by means for forming a guide 5, which means can be produced in a planar technology preferrably by a photolithographic process. The entire arrangement of the fiber 2 and the means for forming the guides 5 is covered by a reflective layer 6, which can be produced by vapor depositing a metal layer or by providing a layer of dielectric material.

The substrate 1 consists of a basic substrate 11, for example glass or a plastic layer. An upper surface of the basic substrate 11 is provided with a conductive layer 12, for example aluminum. A layer 13 of semiconductor material which is of at least a conductive type, for example silicon having an n doping, is disposed on the electrically conductive layer 12 and is provided with a covering layer 14, which acts as a mask for the layer 13 except for a gap 141. Directly beneath the gap 141, the layer 13 is provided at the surface adjacent the gap with an area 17 which is doped opposite to the layer 13. Thus, the entire substrate 1 comprises a semiconductor diode forming the detector 9 which is arranged alongside the glass fiber 2 with the gap 141 forming a diode window 141. The electrically conductive coating 12 forms a lower or substrate connection for the diode. The diode is represented only in its essential parts and in a somewhat simplified manner in the figures. In reality, the cover coating 14 may not be of such a simple design as illustrated in the drawings because the area 17 must be provided with electrical contacts. Moreover, the surface of the layer 13 likewise is not exposed at the gap 141, but is masked with a translucent layer, for example a dielectric mirror. A complete realization of the diode which is ideally appropriate for the purposes described herein is offered, for example, by a conventional PIN photo diode in a planar design and/or an avalanche photo diode which are both commercially available. A description of both the PIn photo diode and an avalanche photo diode is contained in Hans-Georg Unger, *Optische Nachrichtentechnik*, Elitera-Verlag, Berlin, 1976, pp. 83–88.

In the arrangement 100, means for forming a signal dispersing point is located in the area of the diode window 141 and is a notch 7 provided in the glass fiber forming the waveguide 2. As illustrated, the notch 7 should have a depth which is equal to or greater than the thickness of the cladding or jacket layer 3. This notch can be produced, for example, by means of a laser beam trimming instrument on the circumference of the fiber and its task is to scatter out a certain share of the light from the glass fiber. For a good fixation of the fiber, it is desired to design or construct the fiber guide means 5 as represented in FIG. 1a with an undercut profile. It is also noted that the notch is partially filled with the reflecting layer 6.

Figure 2A:
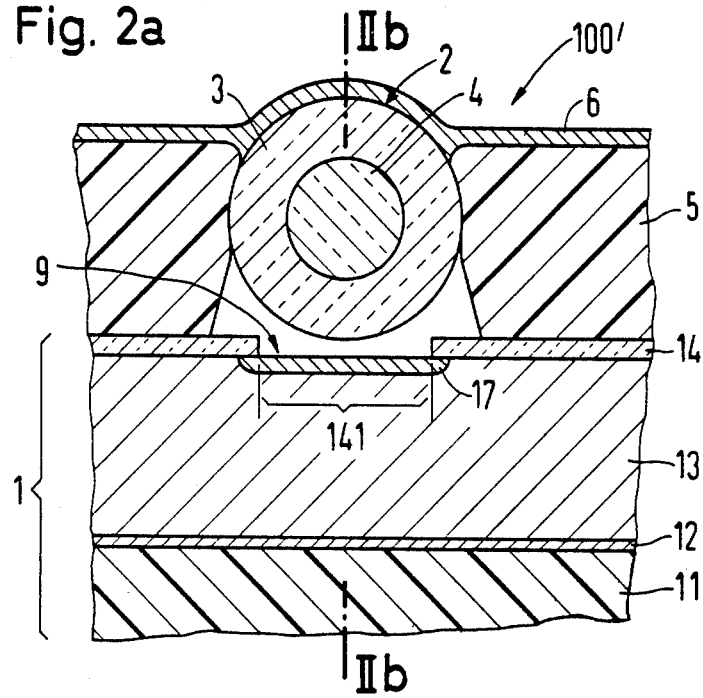
FIG. 2a is a transverse cross-sectional view of a second embodiment of the present invention taken along line IIa—IIa of FIG. 2b.
Figure 2B:
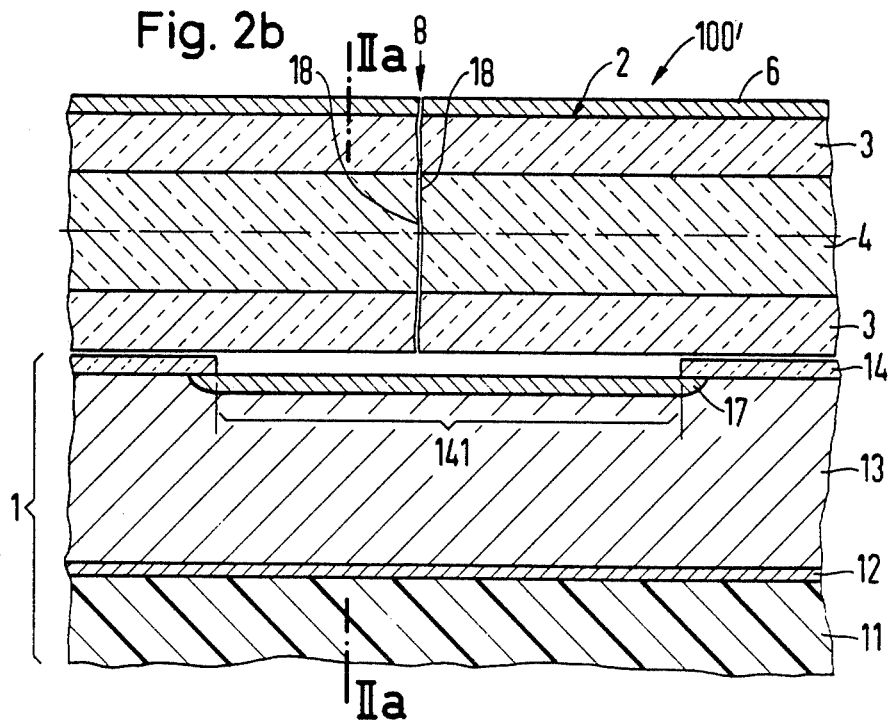

An embodiment of the arrangement is generally indicated at 100' in FIGS. 2a and 2b. In this embodiment, the means for forming the signal dispersing point is formed by a total separation generally indicated at 8 of the glass fiber 2 into two sections with their end surfaces 18, 18 in an abutting relationship. All the other structure of the arrangement 100' is the same as in the arrangement 100 in FIGS. 1a and 1b and similar element numbers are utilized therefor. If applicable, the interstice between the abutting end surfaces 18, 18 of the glass fiber 2, which are located without any lateral displacement, may be filled with an immersion material, for example immersion cement.

Figure 3A:
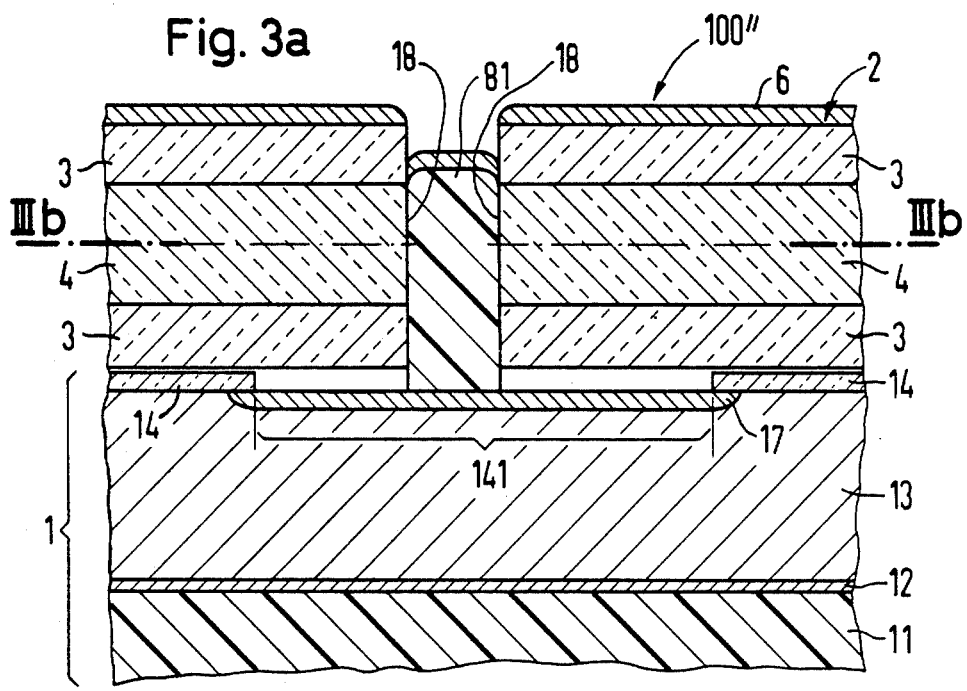
FIG. 3a is a longitudinal cross section of an embodiment illustrated in FIGS. 2a and 2b taken along line IIIa—IIIa in FIG. 3b.
Figure 3B:
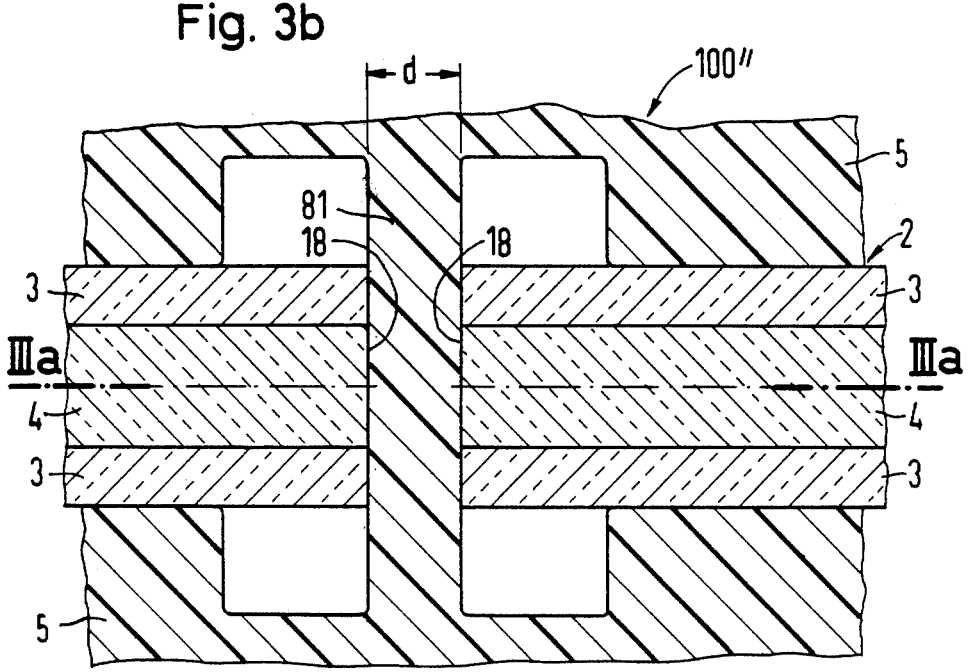

The distance between the abutting end surfaces 18, 18 of the fiber 2 from each other may be adjusted according to the desired branched off relationship. Therefore, it is also possible to provide a bridge 81 (FIGS. 3a and 3b) which is made from a material which is the same material which the means 5 for guiding the fiber 2 are produced. Thus, when producing the means 5 photolithographically in a light sensitive layer, a bridge having a width d, for example 50 microns, is simultaneously formed for the arrangement indicated at 100'' in FIGS. 3a and 3b. As in the previous embodiments, the bridge 81 acts as an immersion material between the end surfaces 18, 18 of the fiber 2 and an exposed upper surface of the bridge 81 is covered by a portion of the reflecting layer 6.

Figure 4:
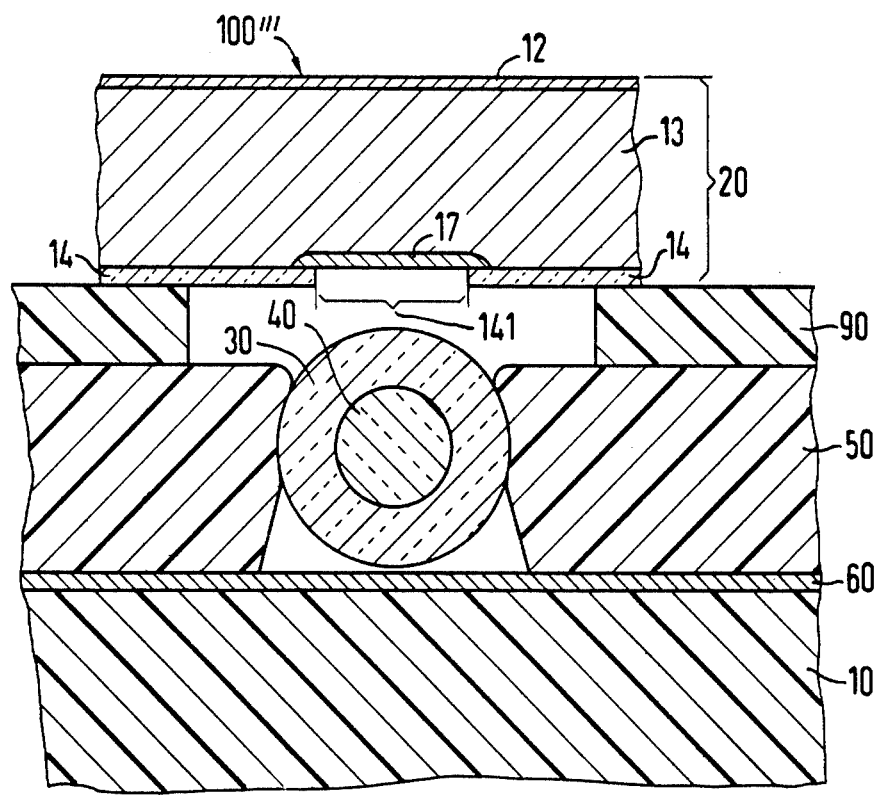
FIG. 4 is a transverse cross-sectional view of another embodiment of the invention.

Another embodiment of the arrangement is generally indicated at 100''' in FIG. 4. In this embodiment, a glass fiber having a core 40 and a cladding layer 30 is arranged directly on a substrate 10 and covered by a second stratum 20. The substrate 10 may consist of either glass, a plastic or a metal and is provided with a reflecting layer 60, which layer is provided with means 50 for guiding the fiber on the substrate. As in the previous embodiments, the means 50 can be formed photolithographically in a photo sensitive lacquer layer. On top of the guide means 50, a spacing layer 90, for example, also photolithographically formed from a photo sensitive layer or photo sensitive foils, such as sold under the trademark RISTON, are placed on the means 50. The layer 90 has a gap with a wider spacing than the diameter of the glass fiber.

A photo diode is formed as the second stratum 20 and is built up similar to the photo diode of the embodiments of the arrangements 100, 100' and 100'', which are illustrated in FIGS. 1a, 1b, 2a, 2b, 3a and 3b, respectively. Briefly, the photo diode includes a semiconductor layer 13, which has been n-doped, that has a region 17, which is doped opposite to the layer 13 with a cover or mask 14 forming a gap or detector window 141 for the detector which has appropriate conductive layers including the conductive layer 12.

In the arrangement 100''', the fiber having the cladding 30 and the core 40 is provided with means for forming a signal dispersing point, which, as in the previous embodiments, may be a notch, which is similar to notch 7, disposed on the fiber surface which is opposite the window 141. In other words, the notch is adjacent to the layer 60. The means for forming a signal dispersing point may be an entire separation of the fiber into two distinct parts with the abutting end surfaces of the fibers being aligned. As in the previous embodiments, an immersion material may be disposed between the two end surfaces. This immersion material may be a separate material or a bridge of the photo lacquer layer utilized in forming the guide means 50 and formed simultaneously therewith.

While the illustrated embodiments show a waveguide comprised of an optical fiber having a core with a cladding, it should be noted that other optical waveguides can be utilized. In addition, when utilizing an optical fiber as the waveguide, it can either be an optical fiber which has a step in the index of refraction at the interface between the cladding and the core or may be an optical fiber provided with a gradient in the index of refraction.

Although various minor modifications may be suggested by those versed in the art, it should be understood that I wish to embody within the scope of the patent warranted hereon, all such modifications as reasonably and properly come within the scope of my contribution to the art.

I claim:

1. In an arrangement for branching off a signal from a fiber optical waveguide and detecting a signal with a detector having a detector window disposed adjacent one side of the waveguide, a portion of said waveguide having a portion in the area of said detector being free of bends and having means for forming a signal dispersing point located in the area of the detector window to scatter a part of the signal guided in the waveguide out of the waveguide and into the detector window, the improvements comprising said detector consisting of a semiconductor photo diode having a planar construction with a detector window lying in a two dimensional plane; a photo sensitive layer contacting said window; and a substrate for supporting said layer and diode, said photo sensitive layer in the vicinity of the detector window having a groove shaped aperture for receiving and engaging said portion of the waveguide having said means for forming the signal dispersing point, said means for forming the signal dispersing point comprising a separation extending through the waveguide to divide the waveguide into two sections with their ends aligned in abutting relationship with a gap between the ends and extending substantially cross-wise to the longitudinal axis of the waveguide, said photo sensitive layer having a bridge extending across said groove-shaped aperture and being received in the gap between the ends of the waveguide so that light scattered from the waveguide is received by said window.

2. In an arrangement according to claim 1, which includes the waveguide on a surface opposite the detector window having a reflective layer.

3. In an arrangement according to claim 1, wherein the planar photo diode is formed in the substrate, said photo sensitive layer being supported on said diode and substrate.

4. In an arrangement according to claim 3, wherein the photo sensitive layer is supported directly on the photo diode.

5. In an arrangement according to claim 3, which includes the waveguide on a surface opposite the photo diode having a reflective layer.

6. In an arrangement according to claim 1, wherein the photo sensitive layer is supported directly on said substrate, and said photo diode is supported on said photo sensitive layer opposite said substrate.

7. In an arrangement according to claim 1, wherein the substrate has a reflective layer, said photo sensitive layer being disposed directly on the reflective layer, and said photo diode being supported on the photo sensitive layer opposite to the substrate.

8. In an arrangement for branching off a signal from a fiber optical waveguide and detecting a signal with a detector having a detector window disposed adjacent one side of the waveguide, a portion of said waveguide having a portion in the area of said detector being free of bends and having means for forming a signal dispersing point located in the area of the detector window to scatter a part of the signal guided in the waveguide out of the waveguide and into the detector window, the improvements comprising said detector consisting of a semiconductor photo diode having a planar construction with a detector window lying in a two dimensional plane, a photo sensitive layer contacting said window and being directly supported on a substrate, and a spacing layer having an aperture being interposed between the photo sensitive layer and the photo diode with said aperture of the spacing layer being in the area of the detector window, said photo diode being supported by the spacing layer on a side of the photo sensitive layer opposite said substrate, said photo sensitive layer in the vicinity of the detector window having a groove-shaped aperture for receiving and engaging said portion of the waveguide having the means for forming the signal dispersing point so that light scattered from the waveguide is received by said window.

9. In an arrangement according to claim 8, wherein the means for forming a signal dispersing point consists of a notch extending in the surface of the waveguide adjacent said substrate and opposite said detector window.

10. In an arrangement according to claim 8, wherein the means forming a signal dispersing point consists of a separation extending through said waveguide to divide the waveguide into two sections with their ends being aligned in abutting relationship with a gap therebetween.

11. In an arrangement according to claim 10, wherein the gap extends substantially transverse to the longitudinal axis of the waveguide, and said photo sensitive layer has a bridge extending across said groove-shaped aperture in the area of the detector window, said bridge being received in the gap between the ends of said waveguide.

12. In an arrangement according to claim 8, which includes a reflective layer being disposed on the substrate and the photo sensitive layer being disposed directly on the reflective layer.

13. In an arrangement according to claim 12, wherein the means forming the signal dispersing point comprises a notch disposed on the circumference of the waveguide adjacent said reflective layer and opposite said detector window.

14. In an arrangement according to claim 12, wherein the means for forming a signal dispersing point comprises a separation extending through said waveguides to divide the waveguides into two sections with their ends aligned in abutting relationship with a gap therebetween.

15. In an arrangement according to claim 14, wherein said gap extends substantially transverse to the longitudinal axis of the waveguide, said photo sensitive layer having a bridge extending across the groove-shaped aperture in the photo sensitive layer in the area of the detector window, said bridge of material being received in said gap.

* * * * *